Aug. 23, 1955
L. S. SNELL ET AL
2,715,837

STARTING APPARATUS

Filed Sept. 23, 1952
2 Sheets-Sheet 2

Inventor
LEONARD S. SNELL
GEORGE H. MURRAY
By Watson, Cole,
Grindle & Watson
Attorneys

United States Patent Office 2,715,837
Patented Aug. 23, 1955

2,715,837
STARTING APPARATUS

Leonard Stanley Snell, Feltham, and George Hamilton Murray, Pinner, England, assignors to D. Napier & Son Limited, London, England, a British company Application September 23, 1952, Serial No. 311,031

Claims priority, application Great Britain October 2, 1951

10 Claims. (Cl. 74—7)

This invention relates to starting apparatus for power units of the kind comprising driving and driven members connected respectively to driving and driven positive clutch elements which are arranged to come into engagement automatically by relative axial movement between them when the driving member is driven for starting purposes by a shaft or similar rotary starting member from a starting motor or other source of power and to move out of engagement automatically when the driven member over-runs the driving member after starting has been effected.

The invention is concerned with two-directional starting apparatus of the above kind, that is to say, with starting apparatus of the kind referred to including means for imparting rotation to the driving member in either direction at will for the purpose of starting a power unit in either direction, and is especially but not exclusively applicable to two-directional starting apparatus for turbulents the rotors of which have to be rotated by an external source of power before the turbine is brought into effective operation.

An object of the invention is to provide two-directional starting apparatus of the kind referred to which will be simple and effective in operation, can be of a robust nature and will generally meet practical requirements.

Two directional apparatus according to the present invention includes two pairs of positive clutch elements, one element of each pair being carried by a driven clutch member and the other by a driving clutch member, and the arrangement being such that rotation of a power driven rotary starting shaft or similar rotary starting member by which power can be transmitted to the driving member in one direction or the other tends to bring one or other pair of clutch elements into engagement by relative axial movement between the driving and driven clutch members in one direction or the other whereas the over-run of the driven member over the driving member when, after starting, the driven member begins to be driven faster than the driving member, causes disengagement of the appropriate pair of clutch elements, and manually controllable stop mechanism having two operative positions in which it limits the relative axial movement of the driving and driven members from the neutral position respectively in one direction or the other to prevent engagement of one or other pair of clutch elements. The stop mechanism may have a third neutral position in which it limits the axial movement of the movable clutch member in both directions to prevent engagement of either pair of clutch members.

Preferably the stop mechanism will be so associated or combined with switch mechanism or the equivalent for bringing the starting motor into operation or otherwise transmitting rotation to the rotary starting member in one direction or the other that rotation can only be imparted to the rotary starting member in either direction when the stop mechanism occupies the appropriate position to permit engagement of the appropriate pair of clutch elements and prevent the engagement of the other pair of clutch elements. Thus, in a convenient arrangement there is an interconnection or interlock between the switch mechanism or the equivalent and the stop mechanism such that, when the switch mechanism is in its inoperative position the stop mechanism or the equivalent occupies the position in which it prevents engagement of either pair of clutch elements, while when the switch mechanism or the equivalent is moved into position to cause rotation of the rotary starting member in one direction or the other, the stop mechanism is automatically also moved into the position in which it permits engagement of the appropriate pair of clutch elements while preventing engagement of the other pair of clutch elements.

The construction and arrangement of the clutch members and of the stop mechanism may vary widely but in one convenient arrangement the driving or the driven clutch member is fixed axially while the other of these members is so connected to a hollow transmission shaft, as by helical splines or a quick pitch screwthread, as to move axially on said shaft in one direction or the other with relative rotation between it and the shaft in one direction or the other to cause engagement of one pair of clutch elements or the other, while the stop mechanism includes one or more stop members having parts arranged to slide in a generally radial direction through holes in the hollow shaft so as to project therefrom and limit the movement of the axially movable clutch member relatively thereto. The operating mechanism for the stop member or members in such an arrangement conveniently extends along the bore of the hollow shaft, the arrangement being such that parts of the stop member or members can be positioned by the operating mechanism so as to lie in the path of the axially movable clutch member just beyond each end thereof when in its neutral position so as to limit or prevent its axial movement in either direction from a neutral position, or one or other of such parts can be withdrawn at will to permit such axial movement in one direction or the other.

Means will preferably be provided, in a manner known per se whereby a frictional drag is exerted between the driving and driven clutch members when they are rotating relatively to one another so as to assist or cause the initial engaging movement in either direction while the teeth of each pair of positive clutch elements are preferably of ratchet tooth form so as to have inclined back faces which come into engagement to assist disengagement of the clutch elements when the over-run referred to occurs.

In such an arrangement the stop mechanism preferably comprises a single stop member the ends of which lie and slide respectively in axially displaced holes in the hollow shaft, these holes being situated respectively adjacent to the two ends of the axially movable clutch member when in its neutral position and having a common longitudinal axis inclined to and passing through the axis of the hollow shaft so that the intermediate part of the stop member extends in an inclined direction across the bore of the shaft, and operating mechanism for moving the stop member comprising an operating rod arranged to slide axially within the bore of the hollow shaft and being formed to provide clearance for the stop member and provided with a pair of slots which extend generally longitudinally but in a plane inclined to the axis of the hollow shaft and are engaged by opposite ends of a pin passing transversely through the stop member so that, with longitudinal movement of the operating rod, the sides of the slots act as ramps or cams on the pin to move the stop member, after the manner of a locking bolt. The dimension of the parts are such that the locking member can be moved into one or other of two limiting positions in which one end thereof or the other only projects into the path of the axially movable clutch member or into an intermediate position in which both ends lie in the path of the axially movable clutch member.

Moreover, where means for exerting a frictional drag are provided the axially movable clutch member may be the driving member and may be surrounded by a part which rotates with the driven member and carries friction elements pressed radially inwards into engagement with the driving member by springs and so constructed and arranged that when the driven member reaches a predetermined rotational speed the friction elements automatically move against the action of their springs under the action of centrifugal force out of contact with the driving member.

The invention may be carried into practice in various different ways, but one embodiment of the invention as applied to the starting of a reversible turbine rotor will now be described with reference to the accompanying drawings, in which.

Figure 1:
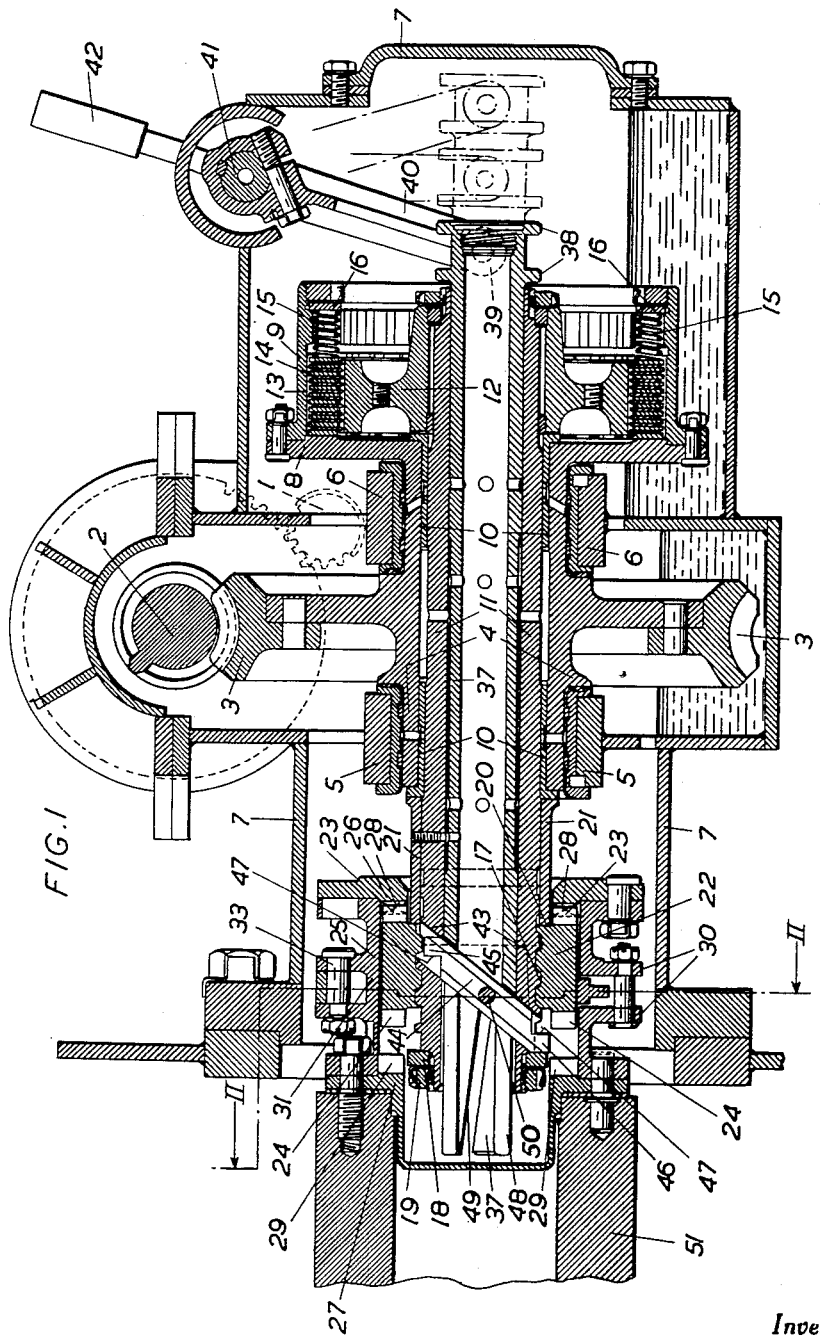
Figure 1 is a sectional side view of the starting apparatus.

The apparatus comprises a driving shaft 1 arranged to be driven in either direction by a starting motor (not shown) and connected by a worm 2 and worm-wheel 3 or other reduction gearing to a hollow driven shaft 4 supported in bearings 5 and 6 in a stationary casing 7. On one end of the hollow driven shaft is a flange 8 to the outer circumferential edge portion of which is bolted a cylindrical housing 9 extending from the flange 8 in a direction away from the shaft 4. Extending through and supported in bearings 10 within the hollow driven shaft 4 is a further hollow shaft 11 (hereinafter called the rotary starting shaft) one end of which extends into the housing 9, and has rigidly mounted on it a hub member 12 forming the driven member of a multi-plate frictional coupling the driving member of which is constituted by the housing 9. Thus, adjacent clutch plates 13 and 14 of this frictional coupling are connected by splines or the equivalent respectively to the hub member 12 and the housing 9, while a series of helical compression springs 15 are arranged between the outermost clutch plate and an abutment ring 16 secured within the outer end of the housing 9.

The end portion of the rotary starting shaft 11 remote from the friction coupling has formed on it a quick-pitch screw thread or a series of helical splines 17 (hereinafter referred to as helical splines) located between a stop ring 18 secured by a ring nut 19 to the adjacent end of the shaft and the end 20 of a thrust sleeve 21 which abuts against the bearing 10. Engaging the part of the rotary starting shaft 11 carrying the helical splines 17, but of shorter length than such splined portion, is a collar 22 (hereinafter called the helically splined collar) formed integrally with a quick-pitch screw thread or with splines to engage the screw-threaded or splined portion 17 of the shaft 11 so that rotation of the helically splined collar 22 on the shaft in one direction or the other will cause it to move axially relatively to the shaft within the range determined respectively by the stop ring 18 and the end 20 of the thrust sleeve 21. Formed on each end face of the helically splined collar 22 is a set of clutch teeth 23, 24 of the dog clutch type, the teeth of each set being however of ratchet tooth form so that each set of teeth can transmit a drive in one direction only. The clutch teeth 23 at one end of the helically splined collar 22 are formed to transmit a drive in the opposite direction from the teeth 24 at the other end of the helically splined collar.

Surrounding the splined end 17 of the shaft 11 and the helically splined collar 22 is a tubular clutch driven member 25 having an internal diameter which is slightly greater than the external diameter of the helically splined collar 22, this driven member 25 having secured thereto end plates 26, 27 which project radially inwards to form in effect internal end flanges the inner faces of which are formed with sets of ratchet type clutch teeth 28, 29 arranged to cooperate respectively with the sets of similar teeth 23, 24 on the two ends of the helically splined collar 22.

Figure 2:
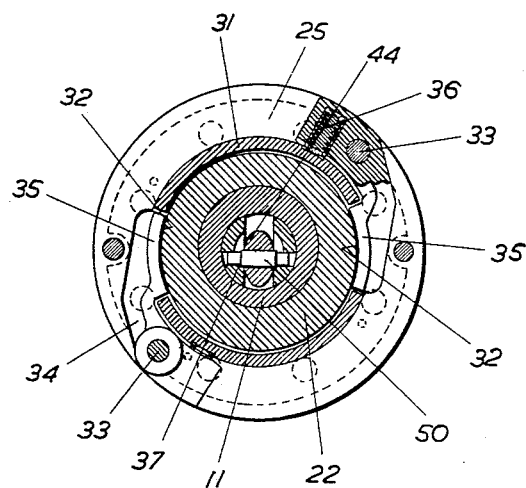
Figure 2 is a cross-sectional view on the line II—II of Figure 1.

The clutch driven member 25 is formed with a pair of parallel spaced circumferential flanges 30 near the centre part 31 of its length with two apertures 32 passing radially through the part 31 at diametrically opposite circumferential points (see Figure 2). Pivotally supported between the flanges 30 by bolts 33 passing through the flanges are two or more rocker members 34 one end of each of which is formed as a friction shoe 35 passing through one of the apertures 32 in the driven member so as to make frictional contact with the circumference of the helically splined collar 22 to exert a frictional drag thereon, while the other end of each rocker member 34 is acted upon by a compression spring 36 lying within a suitable housing therein and bearing against the part 31 of the driven member 25 tending always to maintain the shoe 35 in such frictional contact with the collar 22. The end of each rocker 34 which carries the shoe 35 is of such mass that upon rotation of the driven member 25 the rocker 34 will tend to be moved by centrifugal force against the action of its spring 36.

It will be seen that with the apparatus so far described if the starting shaft 11 is rotated in one direction or the other by the starting motor or the equivalent through the frictional clutch device 9 and 12, while the driven member 25 is stationary, the frictional drag imposed upon the helically splined collar 22 by the shoe members 35 will cause relative rotation between the helically splined collar 22 and the splined part 17 of the starting shaft 11 such as to cause the collar 22 to move axially thereon to bring one set of clutch teeth 23 or 24 on the collar 22 into engagement with its cooperating set 28 or 29 on the driven member according to the direction of rotation. The arrangement is such that the travel of the helically splined collar 22 in either direction on the screw-threaded part 17 of the starting shaft 11 is limited respectively by the stop ring 18 and the end face 20 on the thrust sleeve 21 so that while either pair of sets of clutch teeth can engage, the collar 22 cannot exert an axial force on the driven member 25, nor will the collar 22 tend to jam on the splined portion 17.

Means are provided for limiting the travel of the helically splined collar 22 from its central or neutral position in which both pairs of sets of clutch teeth 23, 28, 24, 29 are out of engagement. These means comprise a tubular operating rod 37 extending and slidable within the rotary starting shaft 11 and projecting from the end of that shaft adjacent to the frictional driving device 9, 15, such projecting end being provided with spaced collars 38 for engagement by rollers 39 on a forked operating member 40 mounted upon an oscillating control shaft 41 provided with an operating lever 42 by which the hollow operating rod 37 can therefore be moved axially. Extending across the interior of the splined parts 17 of the starting shaft 11 in a direction inclined to the axis of that shaft at an angle of approximately 50 degrees and projecting and slidable through holes 43 in the shaft which are thus displaced axially from one another and extend through the shaft respectively at points adjacent to the ends of the splined part 17 is a sliding bolt or stop member 44 of such dimensions that when it occupies a central or neutral position its two ends 45, 46 project through the two ends of the splined part 17 of the shaft 11 into the path of the helically splined collar 22 so as to prevent that collar moving axially in either direction from its neutral position, whereas by sliding the stop member 44 in one direction or the other one of the ends 45 or 46 can be withdrawn so as to permit movement of the helically splined collar 22 on the shaft 11 in one direction or the other from that position. The ends 45, 46 of the stop member 44 are preferably formed with step-like flats 47 lying in planes parallel to the ends of the helically splined collar 22 and forming appropriate surfaces for engagement with the ends of that collar. The tubular operating rod 37 is suitably sloted at 48 where the stop member 44 passes therethrough so as to permit free relative movement between these parts, and in addition is formd with a pair of slots 49 lying in a plane which is inclined to the axis of the rod and contains the axis of a pin 50 passing transversely through the stop member 44 with its ends engaging the slots 49 so that upon longitudinal movement of the hollow operating rod 37 the sides of the slots 49 act after the manner of ramps or cams on the pin 50 to move the stop member 44 into its various positions after the manner of a locking bolt.

Switch mechanism (not shown) is provided for causing rotation of the driving shaft 1 by means of the starting motor in either direction, and this switch mechanism is conveniently inter-locked with or combined with the oscillating control shaft 41 by which the operating rod 37 is moved in such manner that movement of the control rod 37 into a position in which axial movement of the helically splined collar 22 from its neutral position can take place in one direction or other to cause engagement of one of the pairs 23, 28, or 24, 29 of sets of clutch teeth, automatically causes the starting shaft 1 to be rotated in the appropriate direction.

In operation therefore during starting in either direction the appropriate pair of sets of clutch teeth 23, 28 or 24, 29 is engaged until the driven member 25, which in the present example is coupled to a turbine rotor 51 begins to overrun the rotary starting shaft 11 whereupon disengagement of the clutch teeth automatically occurs by movement of the helically splined collar 22 into its neutral position, movement beyond that position being prevented by the stop member 44, after which movement of the starting control into its normal inoperative position automatically moves the stop member 44 into its central position to prevent engagement of either pair of sets of clutch teeth.

The frictional driving device 15, 9 ensures that if incidentally the apparatus is operated with the turbine already running, the torque which can be transmitted through the starting apparatus is limited by slipping of this device and damage is thus prevented. The device may in fact be designed to transmit somewhat less torque than the maximum which the starting motor is capable of applying so that it will slip even when that maximum torque is applied.

Although the apparatus described includes three controlling positions "forward," "neutral" and "reverse" for the operating rod 37, the stop member 44, and hence three positions for the helically splined collar 22, it will be understood that in some cases the neutral position may be dispensed with. In such case when the driven member 25 begins to over-run the rotary starting shaft the collar 22 will move axially to disengage one pair of clutch teeth, but will be prevented from engaging the other pair of clutch teeth by the appropriate end of the stop member 44.

What we claim as our invention and desire to secure by Letters Patent is:

1. A two-directional rotational starting apparatus for a power unit including in combination two rotary members consisting of a driven member connected to said power unit and a reversible rotary starting member, a common clutch member so connected to a first one of the rotary members that relative rotation between the common clutch member and the said first rotary member in opposite directions causes the common clutch member to move in opposite axial directions respectively, two clutches each including a first clutch element mounted on said common clutch member and a second clutch element connected to a second one of said rotary members, said clutches being engaged selectively by movements of said common clutch member in opposite directions axially of said first rotary member, a friction coupling between the common clutch member and the second rotary member for effecting movement of the common clutch member axially of the first rotary member in a direction dependent upon the direction of rotation of the rotary starting member, so as selectively to engage the appropriate one of the clutches which is to be operative, and stop mechanism having two operative positions in which it respectively limits the axial movement of the common clutch member in opposite axial directions to prevent engagement of the inoperative clutch when, due to the driven member overrunning the rotary starting member when the power unit starts, the common clutch member moves axially to disengage the operative clutch.

2. A two directional rotational starting apparatus for a power unit as claimed in claim 1 including control means for causing the power driven rotary starting member to be rotated in one direction or the other at will, and an interconnection between said control means and the stop mechanism which ensures that when the control means are operated to cause rotation of the rotary starting member in either direction the stop mechanism occupies the position in which it prevents engagement of the pair of clutch elements which are not engaged during initial rotation of the rotary starting member but tend to be engaged when the driven member begins to overrun the rotary starting member.

3. A two directional rotational starting apparatus for a power plant as claimed in claim 2 wherein the said second rotary member on which the said common clutch member is mounted is hollow and the stop mechanism comprises a stop member having parts movable in the radial direction relatively to the hollow shaft so as to lie in the path of the common clutch member beyond either end thereof and thus limit the axial movement of said common clutch member in one direction or the other, and including an operating member, extending along the bore of the hollow shaft and acting on the said stop member to cause the said movement thereof in a radial direction.

4. A two directional rotational starting apparatus for a power plant as claimed in claim 1 in which the said clutch member has formed on opposite axial ends of it respectively one of the clutch elements of each pair, a hollow shaft on which the said common clutch member is mounted for combined axial and rotational movement to bring the pairs of clutch elements respectively into and out of engagement, and in which the said stop mechanism comprising a stop member the ends of which lie and can slide respectively in axially displaced holes in the hollow shaft, these holes having a common longitudinal axis inclined to and passing through the axis of the hollow shaft whereby the intermediate part of the stop member extends in an inclined direction across the bore of the hollow shaft, and operating mechanism for the stop member including a control rod extending along the bore of the hollow shaft and operatively connected to the stop member to move it in the direction of its length, the dimensions of the stop member being such that when moved in either direction one or other of its ends move into the path of the common clutch member to prevent engagement of the adjacent pair of clutch elements.

5. A two directional rotational starting apparatus for a power unit as claimed in claim 4 including control means for causing the power driven rotary starting member to be rotated in one direction or the other at will, and an interconnection between the control means and the control rod such that upon operation of the control means to cause rotation of the power driven rotary starting member in either direction the rod is moved in the appropriate direction to prevent engagement of the pair of clutch elements which will tend to be engaged during the over-run of the driven member over the starting member when starting in the appropriate direction has been effected.

6. A two directional rotational starting apparatus for a power unit as claimed in claim 5 including means on the hollow shaft limiting the axial movement of the common clutch member axially in each direction on the hollow shaft to a degree permitting engagement of the appropriate operative clutch but not permitting the common clutch member to exert an axial thrust on the second rotary element.

7. A two directional rotational starting apparatus for a power unit as claimed in claim 1 in which the stop mechanism has an intermediate position in which it prevents engagement of either of the pairs of clutch elements.

8. A two directional rotational starting apparatus for a power unit as claimed in claim 1, including means for rendering inoperative the friction coupling between the common clutch member and the second rotary member when the speed of the driven member reaches a predetermined value.

9. A two directional rotary starting apparatus for a power unit including in combination a reversible electric starting motor, switch apparatus for bringing the motor into operation in either direction at will, a hollow driving shaft, transmission mechanism between the electric motor and the driving shaft, a driven shaft coaxial with the driving shaft, a quick pitch screw-thread on the driving shaft, a sleeve constituting a common clutch member having a quick pitch screwthread in its bore engaging the quick pitch screwthread on the driving shaft so as to move axially on the said driving shaft when rotated relatively thereto, positive clutch elements formed on each end of the said common clutch member, cooperating positive clutch elements rigid with the driven shaft and lying respectively opposite to the two ends of the common clutch member so as to be engageable with the clutch elements formed on said ends, frictional means connected to the driven shaft and acting on the circumference of the common clutch member to tend to cause it to rotate with the driven shaft, a stop member extending across the interior of the part of the hollow driving shaft on which the quick pitch screwthread is formed with its ends slidably arranged in axially displaced holes extending through diametrically opposite sides of the hollow shaft at points adjacent to the ends of the quick pitch screwthread, the length of the stop member being such that each of its ends can be caused to extend into the path of one end of the sleeve to limit the axial travel of the sleeve in the appropriate direction and thereby prevent engagement of the clutch elements on the adjacent end of the sleeve with the cooperating clutch elements, an axially movable control rod within the bore of the driving shaft, an operative connection between this control rod and the stop member causing longitudinal movement of the stop member with axial movement of the rod, means for moving the control rod axially, and an interconnection between the control rod and the switch apparatus operation of the switch apparatus to cause rotation of the driving shaft in either direction is dependent on the control rod also being moved to prevent engagement of the pair of clutch elements which is not then brought initially into engagement.

10. A two directional rotary starting apparatus for a power unit as claimed in claim 9, including centrifugal means connected for rotation with the driven shaft and arranged to disengage the friction means acting on the common clutch member when the speed of the driven shaft reaches a predetermined value.

References Cited in the file of this patent

UNITED STATES PATENTS 1,939,406   Nardone   Dec. 12, 1933